United States Patent [19]

Adachi et al.

[11] Patent Number: 5,187,539
[45] Date of Patent: Feb. 16, 1993

[54] MIRROR SURFACE CHARACTERISTIC TESTING

[75] Inventors: Iwao P. Adachi, Westminster; Stephen B. Coffman, Anaheim Hills, both of Calif.

[73] Assignee: Rockwell International Corporation, Seal Beach, Calif.

[21] Appl. No.: 763,784

[22] Filed: Sep. 23, 1991

[51] Int. Cl.[5] ............................................. G01B 11/27
[52] U.S. Cl. .................................... 356/124; 356/127; 356/153; 356/354; 356/363; 356/374
[58] Field of Search ................................. 356/124–127, 356/153, 374, 376, 377, 353, 354, 363; 351/211, 212

[56] References Cited

U.S. PATENT DOCUMENTS

| | | | |
|---|---|---|---|
| 4,692,003 | 9/1987 | Adachi et al. | 351/212 |
| 4,818,108 | 4/1989 | Eppinger | 356/376 |
| 5,066,119 | 11/1991 | Bertrand | 356/124 |
| 5,066,120 | 11/1991 | Bertrand | 356/124 |
| 5,076,689 | 12/1991 | Adachi | 356/153 |
| 5,080,477 | 1/1992 | Adachi | 356/376 |

*Primary Examiner*—Richard A. Rosenberger
*Assistant Examiner*—Hoa Q. Pham
*Attorney, Agent, or Firm*—H. Fredrick Hamann; George A. Montanye; Tom Streeter

[57] ABSTRACT

An apparatus and method are disclosed for characterizing the surface of mirrors in which a cross-grid type phase grating is illuminated from behind by light reflected from the mirror so as to create a grid-like interference pattern when observed along an observation axis. The fringe lines in the generated or observed interference pattern are correlated to the grating and observed for relative displacement from the grating axis. Apparent fringe index numbers for the fringe lines are used to determine coefficients for a plurality of monomial series which are in turn used to derive Zernike coefficients from which a wavefront contour is obtained. In order to reduce alignment errors during analysis, each fringe line is subtracted from the next lower order line and before monomial coefficients are determined. In further embodiments of the invention, the fringe pattern is transferred, using one or more lenses, to an image digitizer such as a CCD camera which is coupled to a digital computation device that analyzes the observed fringes and computes the series coefficients and then translates them into Zernike coefficient values which are used to reconstruct the mirror surface contours.

18 Claims, 11 Drawing Sheets

MIRROR SURFACE CHARACTERISTIC TESTING

BACKGROUND OF THE INVENTION

1. Field of the Invention

The present invention relates to optical systems and more particularly to a method and apparatus for testing the optical quality of aspherical mirrors. The invention further relates to an optical technique for mapping the surface defects in spherical or non-circularly symmetric mirrors.

2. Related Technical Art

High quality reflective mirrors are used in a variety of advanced optical applications such as image scanners or sensors, image duplication, or image digitizing systems. In high resolution optical systems, the mirrors must possess high quality optical surfaces and be very accurately aligned to provide a desired high resolution or high image registration. Therefore, it is necessary to provide methods of manufacturing mirrors with very precisely defined focal patterns with extremely minimal zonal or surface defects, and that are capable of high accuracy alignment within a given optical system. The alignment process may include system alignment, but also includes initial alignment of the mirror within a mounting structure for later use.

When flat, circular, or circularly symmetric mirrors are employed it is often simple to align the mirrors by simply using a mechanical measurement of the focal point of the mirror. The size and circular curvature of such mirrors are easy to measure, and from this the focal point or axis is also easily determined. Light beams can also be reflected from the mirror surface and the reflected light observed to form a common intersection point which is used to trace predetermined patterns. Another method is to rotate the mirror while reflecting a collimated light beam or an image from its surface and adjusting the mirror's axis of rotation until a reflected image is stationary. A variety of interferometric techniques are also available using incident and reflected laser light beams and images. However, when dealing with aspherical or parabolic shapes or more complex geometries and offset mirrors, the traditional interferometric methods do not work well.

Many of the more complex aspherical mirrors are manufactured to high tolerances using special diamond turning tools and polishing processes. Unfortunately, these tools and techniques often leave small "tooling" marks or surface imperfections and degradations, which create excessive light scatter or spurious reflections and make the use of high resolution interferometric laser apparatus impossible. At the same time, zonal defects in some aspheric mirrors are of such a size or irregularity in nature that interferometry techniques are severely impacted and often useless.

One method of mirror alignment is to assume that any zonal error is concentric or symmetric about the central optical axis if alignment is perfect. An interferogram is used to detect or focus to a mirror zone, which is then used to establish the optical axis. Likewise, Ronchi tests can be used to find a pattern passing a mirror zone. However, with tooling marks and other surface errors, the zonal symmetry assumption proves to be incorrect and the alignment techniques fail, unless additional information about the surface variations can be provided.

Aspherical mirrors and mirrors having complex surface shapes are required for many advanced optical systems. Therefore, what is needed is a method and apparatus for providing high accuracy measurement of the optical quality and focal characteristics of such mirrors. It is also desirable for any optical technique to be usable with a minimum of expense and complication, while being easily automated for more efficient mirror processing.

SUMMARY

In view of the limitations of the current mirror testing and alignment techniques in the art, one purpose of the invention is to provide a new technique for measuring the optical quality of aspherical mirrors.

Another purpose of the invention is to provide a highly accurate method of aligning aspherical or geometrically complex mirrors.

It is an advantage of the invention that highly accurate and high resolution mirror testing is provided with a minimum of complexity.

Another advantage of the present invention is that it lends itself to automation of some surface testing and alignment procedures.

These and other purposes, objects, and advantages are realized in a method and apparatus for testing and analyzing the optical surface characteristics of mirrors in which a cross-grid type Ronchi grating of preselected and substantially uniform periodicity is positioned along a preselected observation axis for the mirror surface to be analyzed. The periodicity is determined by the wavelengths used for the application of interest but is typically a fraction of a millimeter. The observation axis should be at least an approximate mirror optical axis, which can be achieved using various alignment techniques. Using a projection element, light of preselected frequency is reflected from the mirror surface along the observation axis through the grating, from behind, so as to create a grid like interference fringe pattern at an observation pupil from interaction with the grating. A sampling element is used to sample the fringe pattern at predetermined coordinate locations to determine a relative fringe number for each fringe line in the pattern, and then generate values for Zernike coefficients corresponding to the fringe pattern. The fringe pattern is analyzed to determine the zonal and focal characteristics (defects) of the mirror surface by analyzing lateral displacements of fringe lines from the optical axis. The Zernike coefficients are used in conventional relationships to reconstruct the mirror surface characteristics.

The light is provided by positioning a light reflection element transverse to the observation axis between the mirror and the grating which has at least one optical surface reflective of the light positioned to reflect the light against the mirror surface, and substantially transmissive of light reflected from the mirror. The reflection element is illuminated from the side facing the mirror with a beam of light from a source such as a diode laser operating at a preselected frequency.

The fringe number of each fringe line is estimated at a plurality of coordinate locations along a series of common horizontal and then common vertical positions using a monomial series to represent the fringe number at each position. The series coefficients are derived using a generated plurality of the series and known mathematical relationships. The derived series coefficients are then used to determine corresponding Zernike coefficients.

In further aspects of the invention, a subtraction element is used to form a difference between the monomial series of adjacent fringe lines before solving for a relative fringe number. This subtraction removes errors that can arise from a failure to accurately align the fringe lines with the corresponding mirror axis and allows improved, high speed, mirror analysis.

In further embodiments of the invention, the fringe pattern is transferred, using one or more lenses, such as a null lens assembly, to an image processing or digitizing element such as a CCD type camera or image scanner. The fringe pattern is digitized and electronically scanned to provide a digital representation of the contours of the fringe lines. The scanned or electronic image is used by an indexing element to compute the fringe number at a plurality of coordinate locations along the series of common horizontal and then common vertical positions using the monomial series representations. The coefficients for the generated plurality of monomial series are derived using algebraic relationships and the corresponding Zernike coefficients.

In preferred embodiments, a digital computation device such as a small computer is used to derive the fringe number and determine the Zernike coefficients. At the same time, the resulting Zernike coefficients are used to generate a digital representation of the mirror surface which can be further used to form a visual representation of the mirror surface. The visual representation can be presented for viewing using a presentation device such as a video screen or a printer.

In addition, the digital computation and processing device can be connected to interact with one or more process controllers which are in turn coupled to position translator elements that are connected to the mirror under test and any associated focusing and scanning devices. This allows the automation of the observation and scanning of the mirror surface. The computer or process controllers can be preprogrammed to provide selected position translation commands to movable mounting devices for the mirror. The fringe information can also be recorded or stored for later recall or analysis.

BRIEF DESCRIPTION OF THE DRAWINGS

The novel features of the present invention may be better understood from the accompanying description when taken in conjunction with the accompanying drawings in which like numbers refer to like elements throughout and in which.

DETAILED DESCRIPTION OF THE PRESENT INVENTION

The present invention provides a method and apparatus for testing the optical quality or surface contours and characteristics of mirrors very accurately and efficiently, especially aspherical mirrors. The invention accomplishes this testing by projecting light onto the mirror surface under test and observing it through a grid-type Ronchi grating. The Ronchi grating is positioned along an observation axis relatively near to the focal point of the mirror and generates a grid like interference fringe pattern. The fringe pattern is analyzed to determine the zonal and focal characteristics (defects) of the mirror surface by analyzing lateral displacements of fringe lines from the optical axis. In order to reduce alignment errors during analysis, each fringe line is subtracted from the next higher order line and the difference used to determine a series of monomial coefficients from which Zernike coefficients are then obtained.

Figure 1:
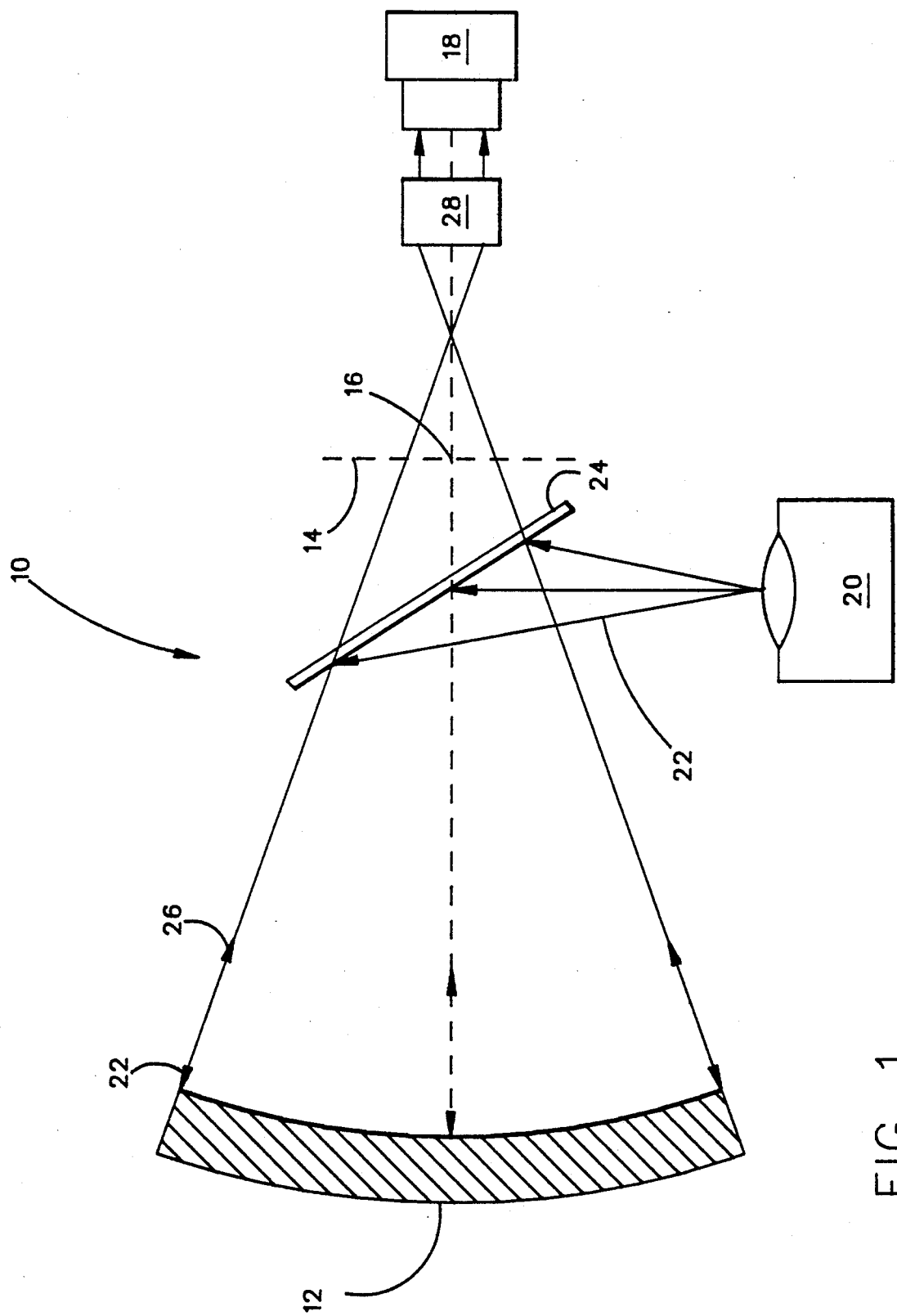
FIG. 1 illustrates an overview of an apparatus for testing the optical quality and surface characteristics of an aspherical mirror as constructed and operating according to the present invention.

The apparatus used for the testing technique of the present invention is illustrated in general schematic form in FIG. 1. In FIG. 1, an optical measurement system 10 is shown for determining the optical surface characteristics for a mirror 12. The mirror 12 can comprise one of a variety of spherical, aspherical, or non-circularly symmetrical mirror designs known to those skilled in the art; the one illustrated in FIG. 1 is presented for purposes of clarity and not as a limitation on the inventive technique. Although the method of the invention can clearly be used for circularly symmetric or flat mirrors, greater advantage is achieved for use with more complex mirror surface shapes.

A linear Ronchi grating 14 is positioned along an observation axis 16 between an observation element 18 and the mirror 12. The observation element 18 can comprise an unaided human eye for initial alignment of the apparatus 10. An unaided eye can typically easily detect the basic fringe distortions at a distance when observing gratings. However, for highly accurate alignment, the observation element will include at least a lens system for observing fine details of the fringe shapes and generally an electro-optical device such as a charge-coupled device type camera or video system. This latter type of device allows both improved observation and recording of mirror characteristics which can be cataloged with the mirror 12.

In order to achieve highly accurate results with the invention, it is desirable to accurately align the mirror with the observation axis and any grid employed. A preferred mirror alignment technique is disclosed in co-pending U.S. patent application Ser. No. 07/676,013 now U.S. Pat. No. 5,076,689 which is assigned to the same assignee, and in which a circular Ronchi grating is used in a similar apparatus. Therefore, such an alignment scheme can be easily incorporated in the present inventive apparatus.

The precise size of the grid grating 14 and reflector 24 depend on their placement along the mirror focal path and the size of the mirror or reflected light patterns, as would be known to those skilled in the art. For a mirror having a diameter or height on the order of 150 mm (about 6 inches) and a radius of curvature on the order of 610 mm (about 24 inches), a grid of about 25 mm (1 inch) or less across is typically employed.

An optical source 20 such as, but not limited to, a diode laser is used to project an illuminating beam 22 onto an optical reflector or reflection element 24 and onto the mirror 12. The reflector 24 can comprise one of several known elements such as an optical flat, beam splitter, prism, or other compound reflection apparatus. The optical source 20 is selected to typically provide spectrally pure and coherent light to provide a strong centrally focused light source and reduce scatter. For this reason a laser-type light source is preferred for this application but other highly collimated optical sources may also prove suitable for achieving the advantages of the invention.

The light source 20 is also chosen to operate at a preselected frequency or in a desired frequency range depending upon the application of the mirror 12. Those skilled in the art will readily recognize that the optical frequency is based on the optical characteristics of the mirror, or its intended applications, the level of accuracy desired, and distances or angles to measure. At the same time, any reflective or partially reflective coatings used in the measurement system 10, such as on the reflector 24, are chosen to enhance operation at the frequency of the optical source 20.

One method of optical analysis would be to employ a linear grating which comprises a series of lines or wires extending parallel to each other and a single axial direction. This provides a fringe pattern which can be analyzed along, or for, one axial direction. The grid is then reoriented or rotated perpendicular to the initial setting and the analysis repeated. However, at the accuracy or resolutions of interest, the realignment of a grating, or use of an additional grating, has proven to provide less than satisfactory results with minimum reproducibility.

Therefore, a new cross grid-type grating is employed in the present invention. The grating 14 is configured as a cross grid-type Ronchi phase grating that uses two series of lines or wires that extend parallel to each other, with each series positioned perpendicular to the other. The result is a true "grid" pattern, also viewed as an array of square openings. The grid lines are spaced apart with a periodicity determined by the frequency of light being used.

An exemplary grating for operation at a light wavelength 680 nm has a periodicity of about 0.333 mm or less in separation between the lines. Such narrow grid spacing is generally needed to accurately map surface variations which are quite small in vertical dimension yet that have a large impact on the mirror quality. The grid grating 14 is positioned across the observation axis 16 in the general optical focal path of the mirror 12 between the reflector 24 and any observation element 18, away from the mirror 12. The square grating 14 is positioned substantially perpendicular to the observation axis, which represents an approximation of the optical axis of the mirror 12.

A variety of grid type gratings can be used to realize the present invention but some may prove more useful than others for very highly accurate alignment. Various types of gratings are used in the art and many are useful in achieving the advantages of the present invention. However, the $\lambda/2$ etched type of grating has been found to provide a high contrast, highly sensitive, fringe generating element. Deep etched or black and white Ronchi type gratings have high frequency components which results in a reduced contrast for the configuration of the invention. Therefore, a half-wave, for the light source wavelength, etched grating is preferred.

Figure 3:
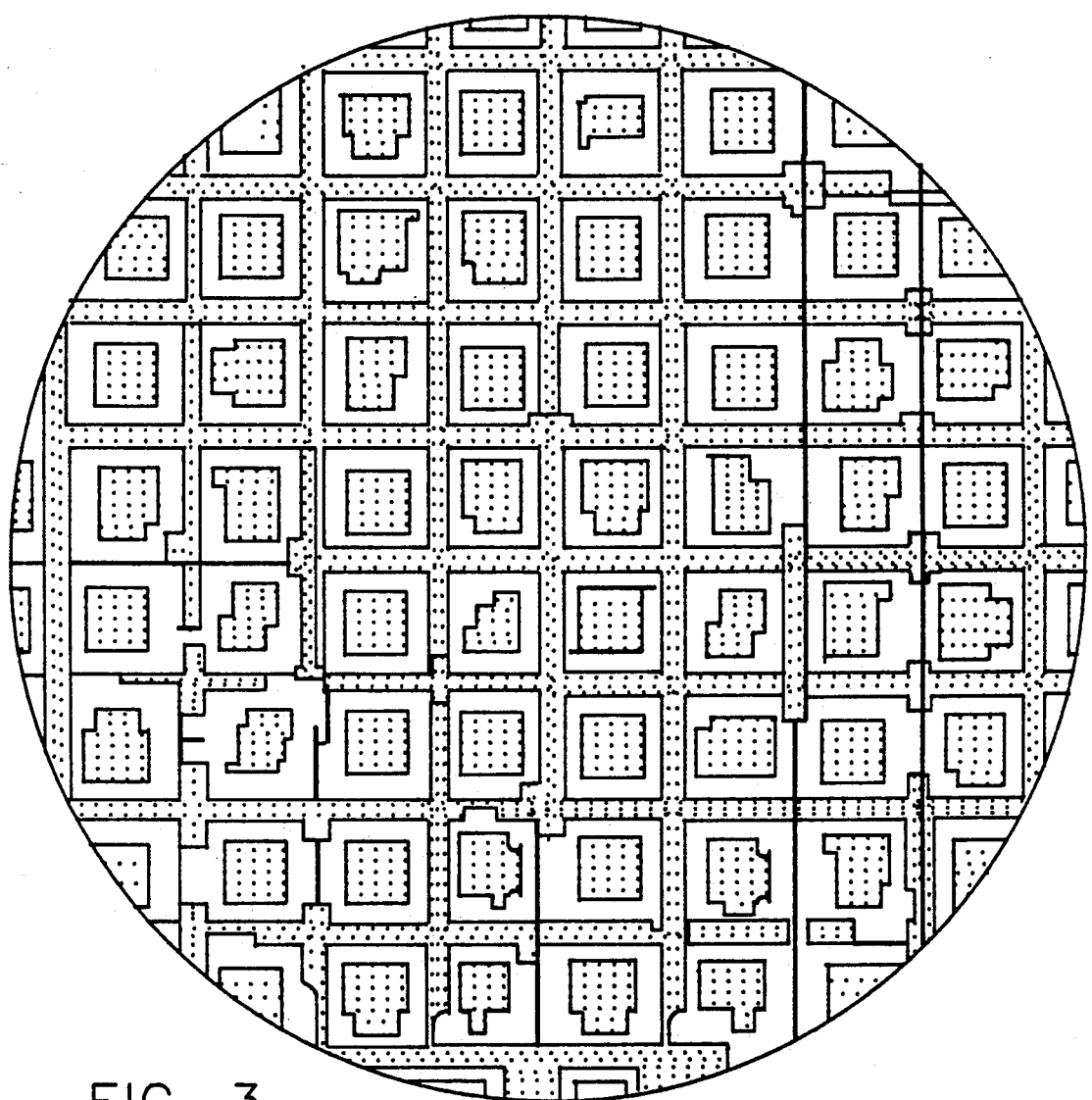
FIG. 3 illustrates an exemplary fringe pattern produced by the apparatus of FIG. 1 when observing a substantially perfect mirror surface.
Figure 4:
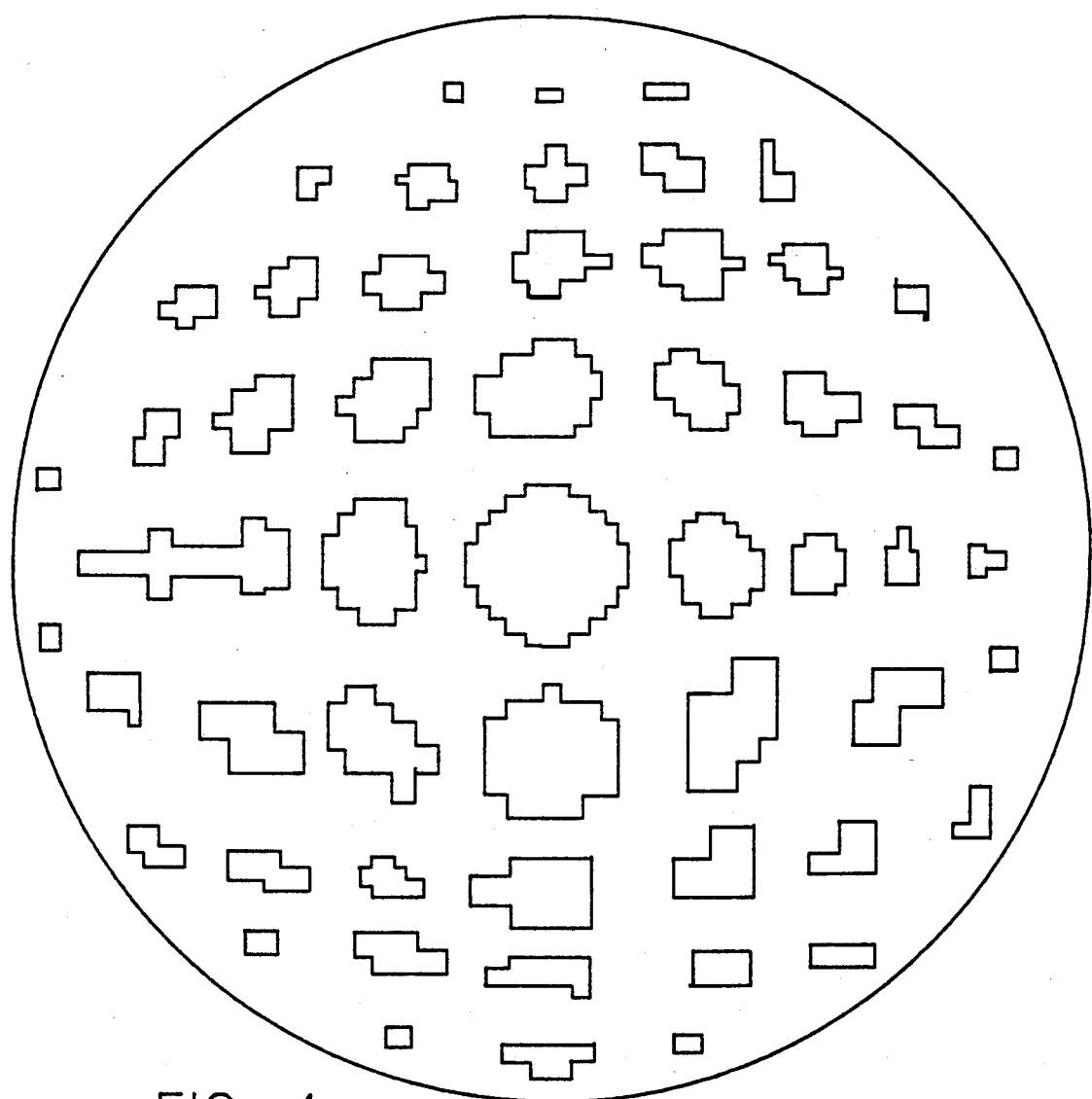
FIG. 4 illustrates an exemplary fringe pattern as produced by the apparatus of FIGS. 1 and 2 when observing an imperfect mirror surface.

The input light beam 22 reflects off of the reflector 24 behind the grid grating 14 and strikes the surface of the mirror 12 where it forms a generalized reflected beam, whose optical characteristics are dependent on the surface of the mirror 12 which will impart phase and directional variations to the reflected light. This light beam is reflected out along the optical axis of the mirror 12 as a light beam 26 where it is intercepted by the grating 14 and is subsequently observed by the observation element 18. The cross grating 14 interacts with the reflected light beam 26 to generate grid-type interference or fringe patterns as illustrated in FIGS. 3 and 4. The fringe patterns illustrated in both FIGS. 3 and 4 were obtained using an exemplary embodiment having the physical dimensions mentioned above, and by using image digitizing and electronic recording. The figures represent measurements of the interference of a 0.33 mm period multi-axis wire grating with the reflected light from a six inch diameter mirror having an approximate focal distance of about twenty-four inches. A light wavelength of about 680 nm was used.

Figure 5:
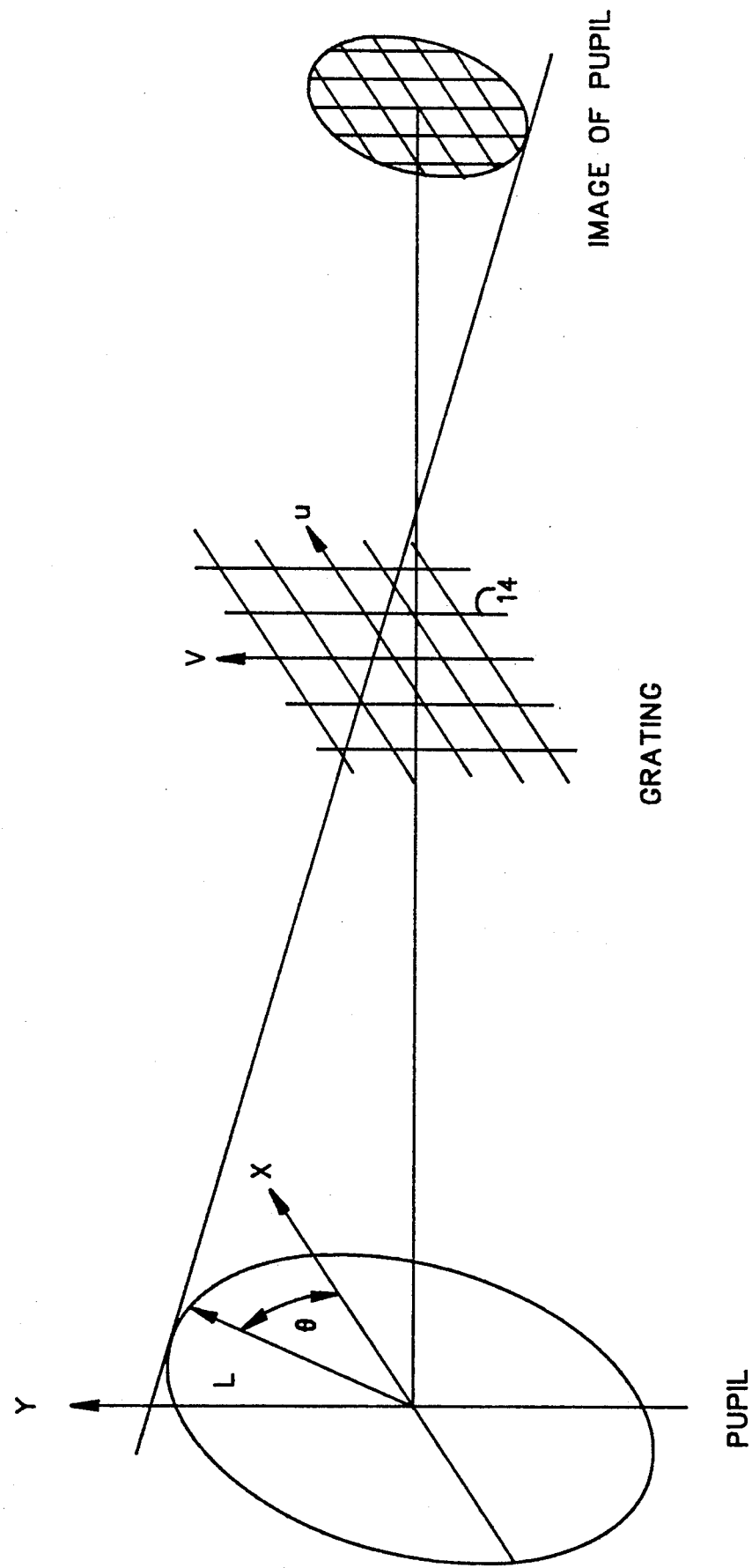
FIG. 5 illustrates the application of optical analysis to the fringe patterns of FIGS. 3 and 4.

Turning for a moment to FIG. 5, the interaction of reflected light with the cross grating and the resulting fringes are described in terms of relative position of an overlaid image within an observation pupil. The reflected light wavefront traveling through the pupil has coordinates X and Y, while the pupil itself has radial coordinates L and 0, which are related to the wavefront according to:

$$X = L \cos \theta$$

and $$Y = L \sin \theta.$$

The grid or grating image on the pupil under observation, say by a camera, will have axial coordinates U and V which are to be aligned with the wavefront and pupil axis, ideally.

When the grating is located near the focus or focal point for the mirror 12, the shadow of the grating on the observation pupil, for the wavefront W(X,Y) is expressed by:

$$\frac{dW(X,Y)}{dL} R = n p \qquad (1)$$

where:
R is the radius of curvature;
Hm is the mirror height;
p is the period of the grating in fixed units, here in mm;
n is the fringe number.
The numerical aperture, NA, is defined as:

$$NA = Hm/R = \sin \theta$$

When the grating 14 is located at a distance d from the paraxial focus point of the mirror, the corresponding change in the wavefront aberration is called the equivalent wave length which can be expressed as:

$$EWL = (1 - \cos \theta)d = [(1 - \cos \theta)/\tan \theta]p \qquad (2)$$

and the relative axial positions for U and V as:

$$U = -R\left(\sin\theta \frac{dW(X,Y)}{dL} + \frac{\cos\theta}{L}\frac{dW(X,Y)}{d\theta}\right)$$

$$V = -R\left(\cos\theta \frac{dW(X,Y)}{dL} + \frac{\sin\theta}{L}\frac{dW(X,Y)}{d\theta}\right)$$

Using the equivalent wave length unit of measure, equation 1 can be expressed as:

$dW(X,Y)/dX = n$ for the X axis, and $dW(X,Y)/dY = n$ for the Y axis.

The wavefront aberrations can be expressed as a generalized monomial series as:

$$\begin{aligned}W(x,y) = &B_{00} + B_{10}x + B_{11}y + B_{20}x^2 + B_{21}xy + \\ &B_{22}y^2 + B_{30}x^3 + B_{31}x^2y + B_{32}xy^2 + B_{33}y^3 + \\ &B_{40}x^4 + B_{41}x^3y + B_{42}x^2y^2 + B_{43}xy^3 + B_{44}y^4 + \\ &B_{50}x^5 + B_{51}x^4y + B_{52}x^3y^2 + B_{53}x^2y^3 + \\ &B_{54}xy^4 + B_{55}y^5 + B_{60}x^6 + B_{61}x^5y + B_{62}x^4y^2 + \\ &B_{63}x^3y^3 + B_{64}x^2y^4 + B_{65}xy^5 + B_{66}y^6 + \ldots\end{aligned}$$ (3)

This expression for the wavefront aberrations can be analyzed at each fringe number, n, or position to determine the coefficient values. When this analysis is accomplished for the grating lines or wires being parallel to the Y-axis, the expression becomes:

$$\begin{aligned}n = &\ dW(X,Y)/dx \\ = &\ [B_{00}] + B_{10} + [B_{11}] + B_{20}2x + B_{21}y + [B_{22}] + \\ &B_{30}3x^2 + B_{31}2xy + B_{32}y^2 + [B_{33}] + B_{40}4x^3 + \\ &B_{41}3x^2y + B_{42}2xy^2 + B_{43}y^3 + [B_{44}] + B_{50}5x^4 + \\ &B_{51}4x^3y + B_{52}3x^2y^2 + B_{53}2xy^3 + B_{54}y^4 + [B_{55}] + \\ &B_{60}6x^5 + B_{61}5x^4y + B_{62}4x^3y^2 + B_{63}3x^2y^3 + \\ &B_{64}2xy^4 + B_{65}y^5 + [B_{66}] + \ldots \\ = &\ B_{10} + B_{20}2x + B_{21}y + B_{30}3x^2 + B_{31}2xy + B_{32}y^2 + \\ &B_{40}4x^3 + B_{41}3x^2y + B_{42}2xy^2 + B_{43}y^3 + B_{50}5x^4 + \\ &B_{51}4x^3y + B_{52}3x^2y^2 + B_{53}2xy^3 + B_{54}y^4 + B_{60}6x^5 + \\ &B_{61}5x^4y + B_{62}4x^3y^2 + B_{63}3x^2y^3 + B_{64}2xy^4 + \\ &B_{65}y^5 + \ldots\end{aligned}$$ (4)

where the bracketed factors $[B_{mn}]$ represent terms which are eliminated or missing through the process of differentiation. At the same, for the grating lines or wires positioned parallel to the X-axis, the expression (Equation 3) becomes:

$$\begin{aligned}n = &\ dW(X,Y)/dy \\ = &\ [B_{00}] + [B_{10}] + B_{11} + [B_{20}] + B_{21}x + B_{22}2y + \\ &[B_{30}] + B_{31}x^2 + B_{32}2xy + B_{33}3y^2 + [B_{40}] + \\ &B_{41}x^3 + B_{42}2x^2y + B_{43}3xy^2 + B_{44}4y^3 + [B_{50}] + \\ &B_{51}x^4 + B_{52}2x^3y + B_{53}3x^2y^2 + B_{54}4xy^3 + B_{55}5y^4 + \\ &[B_{60}] + B_{61}x^5 + B_{62}x^4 2y + B_{63}x^3 3y^1 + B_{64}x^2 4y^3 + \\ &B_{65}5xy^4 + B_{66}6y^5 + \ldots \\ = &\ B_{11} + B_{21}x + B_{22}2y + B_{31}x^2 + B_{32}2xy + B_{33}3y^2 + \\ &B_{41}x^3 + B_{42}2x^2y + B_{43}3xy^2 + B_{44}4y^3 + B_{51}x^4 + \\ &B_{52}2x^3y + B_{53}3x^2y^2 + B_{54}4xy^3 + B_{55}5y^4 + B_{61}x^5 + \\ &B_{62}x^4 2y + B_{63}x^3 3y^2 + B_{64}x^2 4y^3 + B_{65}5xy^4 + \\ &B_{66}x6y^5 + \ldots\end{aligned}$$ (5)

The fringe number n should correspond to the grating (relative wire or line position in grid) coordinate, and is an integer number in a normalized coordinate system. If the grating shadow corresponding to the U,V axis (of the grating image) on the pupil is mis-aligned with the wavefront X,Y axis, an error in the fringe pattern will be introduced.

Where the grating parallel to the X-axis is accurately aligned with that axis, the center grid line, fringe number zero, coincides with the X-axis, and where the grating Y-axis is accurately aligned with that axis, the center grid line coincides with the Y-axis. Therefore, the above equations become:

$dW(X,Y)/dX = 0$, and $dW(X,Y)/dY = 0$.

If the center line or grid element is not coincident with the axis, a substantial error occurs in determining the series coefficients using the above relationships. Not only is the central line computation in error but all coefficients in the series are impacted. The alignment controls the precision of the method. Any error introduced at this point would prevent effective use of the technique since such errors lead to an incorrect value for, or masking of, surface characteristics.

In practice, even though the grating is made to extreme accuracy, on the order of a fraction of a micrometer, it is not practical to align a grating exactly with the X and Y axis. To overcome this misalignment problem, the present invention uses successive fringes and subtracts adjacent fringes along one axial direction from one another, at a common value for the other axis. For example, fringes along the X-axis are subtracted from each other at common Y-axis values, and then the Y-axis fringes are subtracted at common X-axis values. The fringe subtraction is accomplished by subtracting the nth-1 fringe from the nth fringe. Therefore, fringe number 2 is subtracted from fringe number 3, number 1 from number 2, number −2 from number −1 and so forth, depending on the number of fringes being observed. If the periodicity of the grating is made very uniform across the grating, this process avoids errors in generating the fringe number n.

The grating fringes generated by passing the light beam 26 through the grating 14 are then digitized at a series of common axis values. In the present exemplary embodiment, the fringes are first digitized by digitizing each fringe parallel to the Y axis moving from left to right in the field of view and then digitizing the fringes parallel to the X axis moving from bottom to top. However, those skilled in the art will appreciate that other digitizing patterns can be followed provided the overall relationship of the information is maintained.

The fringes are digitized in the above manner, first at a series of common Y-axis values and then common X-axis values. In the present example four such values are selected on a normalized scale, the selected values being separated at substantially equal intervals, here 0.96, 0.72, 0.48, 0.24, and the X axis (0). In practice, the digitizing error in the Y values can be reduced to a peak to valley ratio (P-V) of about 0.006 (for the wavelength of interest) with a mean error of about 0.0035 for the normalized coordinates. With an arithmetic mean value for $Y_m$, we can solve for fringe values using the expression:

$$\begin{aligned}1 - 2B_{20}(x_1 - x_2) = &\ 3(x_1^2 - x_2^2)B_{30} + [Y_m B_{21}] + \\ &2(x_1 - x_2)Y_m B_{31} + [Y_m^2 B_{32}] + \\ &4(x_1^3 - x_2^3)B_{40} + \\ &3(x_1^2 - x_2^2)Y_m B_{41} + \\ &2(x_1 - x_2)Y_m^2 B_{42} + [Y_m^3 B_{43}] + \\ &5(x_1^4 - x_2^4)B_{50} + \\ &4(x_1^3 - x_2^3)Y_m B_{51} + \\ &3(x_1^2 - x_2^2)Y_m^2 B_{52} + \\ &2(x_1 - x_2)Y_m^3 B_{53} + [Y_m^4 B_{54}] + \\ &6(x_1^5 - x_2^5)B_{60} + \end{aligned}$$ (6)

-continued
$$5(x_1^4 - x_2^4)Y_m B_{61} + \\ 4(x_1^3 - x_2^3)Y_m^2 B_{62} + \\ 3(x_1^2 - x_2^2)Y_m^3 B_{63} + \\ 2(x_1 - x_2)Y_m^4 B_{64} + [Y_m^5 B_{65}]$$

where the term $B_{20}$ is easily known from the Ronchi gram and the bracketed terms $[Y_m B_{nm}]$ disappear through subtraction to yield:

$$1 - 2B_{20}(x_1 - x_2) = 3(x_1^2 - x_2^2)B_{30} + \\ 2(x_1 - x_2)Y_m B_{31} + \\ 4(x_1^3 - x_2^3)B_{40} + \\ 3(x_1^2 - x_2^2)Y_m B_{41} + \\ 2(x_1 - x_2)Y_m^2 B_{42} + \\ 5(x_1^4 - x_2^4)B_{50} + \\ 4(x_1^3 - x_2^3)Y_m B_{51} + \\ 3(x_1^2 - x_2^2)Y_m^2 B_{52} + \\ 2(x_1 - x_2)Y_m^3 B_{53} + \\ 6(x_1^5 - x_2^5)B_{60} + \\ 5(x_1^4 - x_2^4)Y_m B_{61} + \\ 4(x_1^3 - x_2^3)Y_m^2 B_{62} + \\ 3(x_1^2 - x_2^2)Y_m^3 B_{63} + \\ 2(x_1 - x_2)Y_m^4 B_{64} \quad (7)$$

Then for a grating parallel to the X direction, the above expression becomes:

$$1 - 2B_{20}(y_1 - y_2) = 2(y_1 - y_2)(B_{22} - B_{20}) + \\ 2X_m(y_1 - y_2)B_{32} + \\ 3(y_1^2 - y_2^2)B_{33} + \\ 2X_m^2(y_1 - y_2)B_{42} + \\ 3X_m(y_1^2 - y_2^2)B_{43} + \\ 4(y_1^3 - y_2^3)B_{44} + \\ 2X_m^3(y_1 - y_2)B_{52} + \\ 3X_m^2(y_1^2 - y_2^2)B_{53} + \\ 4X_m(y_1^3 - y_2^3)B_{54} + \\ 5(y_1^4 - y_2^4)B_{55} + \\ 2X_m^4(y_1 - y_2)B_{62} + \\ 3X_m^3(y_1^2 - y_2^2)B_{63} + \\ 4X_m^2(y_1^3 - y_2^3)B_{64} + \\ 5X_m(y_1^4 - y_2^4)B_{65} + \\ 6(y_1^5 - y_2^5)B_{66} \quad (8)$$

The missing terms which are to be solved for in analyzing an optical surface become:

| Along: | After differentiation | | After subtraction | |
|---|---|---|---|---|
| | X | Y | X | Y |
| | $B_{11}$ | $B_{10}$ | $B_{21}$ | $B_{21}$ |
| | $B_{22}$ | $(B_{20})$ | $B_{32}$ | $B_{31}$ |
| | $B_{33}$ | $B_{30}$ | $B_{43}$ | $B_{41}$ |
| | $B_{44}$ | $B_{40}$ | $B_{54}$ | $B_{51}$ |
| | $B_{53}$ | $B_{50}$ | $B_{65}$ | $B_{61}$ |
| | $B_{66}$ | $B_{60}$ | | | with the term $B_{20}$ being determined directly from the Ronchi-gram. By using two Ronchi-grams in the X and Y axial directions, the entire set of coefficients can easily be determined.

Those skilled in the art will readily appreciate that given the above equations and information generated through observations of the grating pattern fringes, the coefficients can be solved for using known algebraic techniques such as least squares fit and multi-linear regression. When a series of five data points along each of the X- and Y-axis are used, as discussed above, equations 7 and 8 become a series of equations starting with:

$$1 - 2B_{20}(x_{-1} - x_{-2}) = \ldots, 1 - 2B_{20}(x_0 - x_{-1}) = \ldots \\ 1 - 2B_{20}(x_1 - x_0) = \ldots, 1 - 2B_{20}(x_2 - x_1) = \ldots \\ 1 - 2B_{20}(x_3 - x_2) = \ldots, \text{when solving for } x, \text{ and;}$$

$$1 - 2B_{20}(y_{-1} - y_{-2}) = \ldots, 1 - 2B_{20}(y_0 - y_{-1}) = \ldots \\ 1 - 2B_{20}(y_1 - y_0) = \ldots, 1 - 2B_{20}(y_2 - y_1) = \ldots \\ 1 - 2B_{20}(y_3 - y_2) = \ldots, \text{when solving for } y.$$

These relationships are then solved using known mathematical techniques to derive the unknown coefficients. Once the monomial series coefficients are known, the Zernike coefficients are obtained from which the surface contours or characteristics are then computed. Given the monomial series coefficients, the translation to Zernike coefficients is provided in Table I below.

TABLE I

| Zernike | Monomial |
|---|---|
| $R60 =$ | $(5B_{60} + B_{62} + B_{64} + 5B_{66})/320$ |
| $C62 =$ | $(15B_{60} + B_{62} - B_{64} - 15B_{66})/480$ |
| $S62 =$ | $(5B_{61} + 4B_{63} + 5B_{65})/480$ |
| $C64 =$ | $(3B_{60} - B_{62} - B_{64} + 3B_{66})/96$ |
| $S64 =$ | $(B_{61} - B_{65})/48$ |
| $C66 =$ | $(B_{60} - B_{62} + B_{64} - B_{66})/32$ |
| $S66 =$ | $(B_{61} - B_{63} + B_{65})/32$ |
| $C51 =$ | $(5B_{50} + B_{52} + B_{54})/80$ |
| $S51 =$ | $(B_{51} + B_{53} + 5B_{55})/80$ |
| $C53 =$ | $(5B_{50} - B_{52} - 3B_{54})/80$ |
| $S53 =$ | $(3B_{51} + B_{53} - 5B_{55})/80$ |
| $C55 =$ | $(B_{50} - B_{52} + B_{54})/16$ |
| $S55 =$ | $(B_{51} - B_{53} + B_{55})/16$ |
| $R40 =$ | $5R_{60} + (3B_{40} + B_{42} + 3B_{44})/48$ |
| $C42 =$ | $5C_{62} + (B_{40} - B_{44})/8$ |
| $S42 =$ | $S_{62} + (B_{41} + B_{43})/16$ |
| $C44 =$ | $5C_{64} + (B_{40} - B_{42} + B_{44})/8$ |
| $S44 =$ | $5S_{64} + (B_{41} - B_{43})/8$ |
| $C31 =$ | $13C_{51}/3 + (3B_{30} + B_{32})/12$ |
| $S31 =$ | $13S_{51}/3 + (B_{31} + 3B_{33})/12$ |
| $C33 =$ | $4C_{53} + (B_{30} - B_{32})/4$ |
| $S33 =$ | $4S_{53} + (B_{31} - B_{33})/4$ |
| $C22 =$ | $3C_{42} - 6C_{62} + (B_{20} - B_{22})/2$ |
| $S22 =$ | $3S_{42} - 6S_{62} + B_{21}/2$ |
| $R20 =$ | $(B_{20} + B_{22})/4$ | where the odd numbered Zernike terms are generally known as the "coma" terms and the even numbered Zernike terms are generally known as the "astigmatism" terms.

To clarify the operation of the present invention, turn now to the fringe patterns illustrated in FIGS. 3 and 4. To obtain the fringe pattern illustrated in FIG. 3, a substantially perfect mirror surface, within the accuracy of the system, is used and only a substantially square fringe pattern is observed. The grating index or grid pattern for generating this fringe pattern is shown in FIG. 2.

Figure 2:
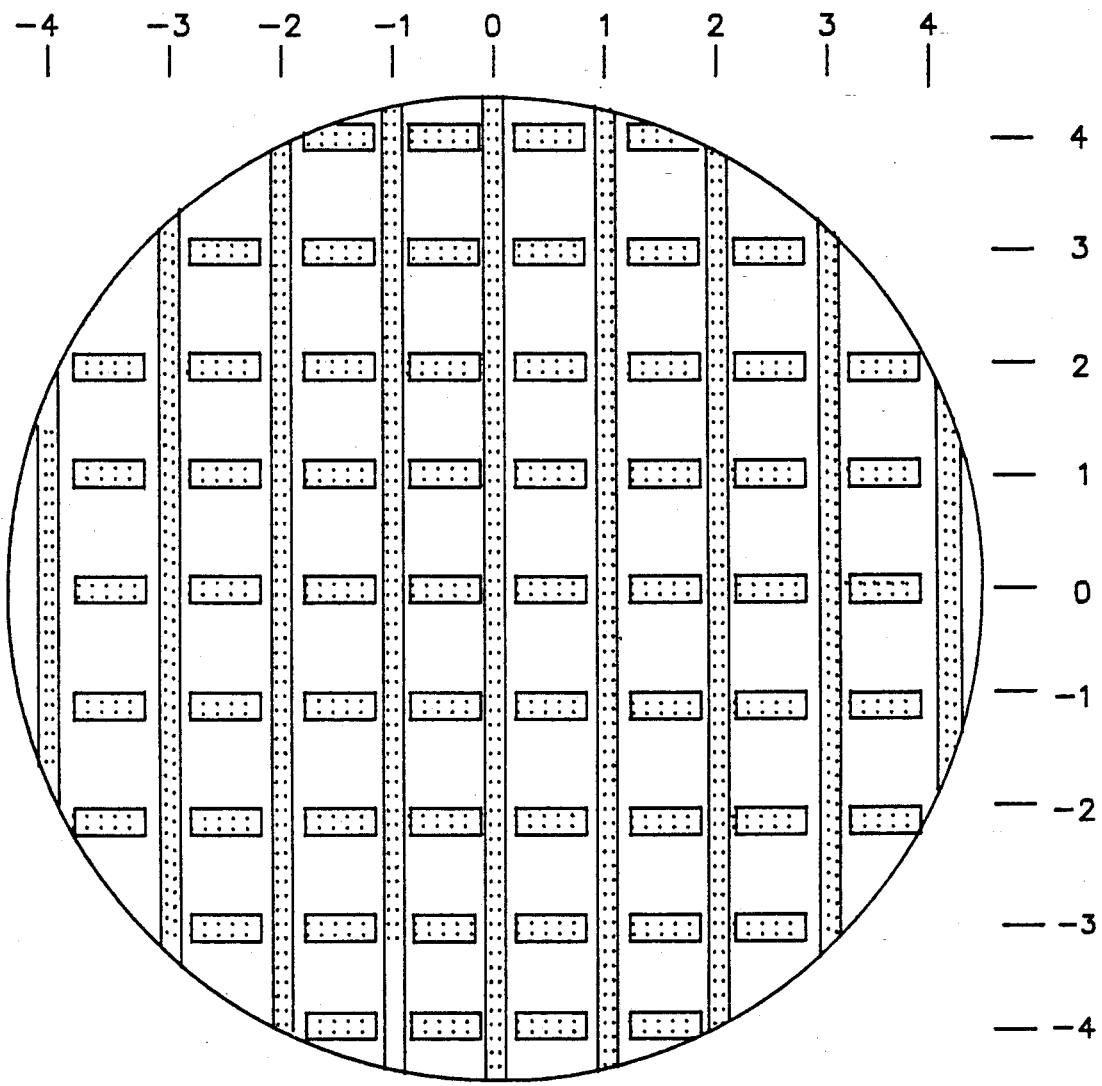
FIG. 2 illustrates an exemplary grid pattern used in the apparatus of FIG. 1 for observing mirror surfaces.

The example of FIG. 2 is for purposes of illustration and represents an enlarged portion of a nearly perfect cross grid pattern. A grid with a 0.333 mm periodicity would provide about 76 fringe lines in each direction within a one square inch size. The lines are labeled with the appropriate index number as they would be for purposes of alignment and digitizing. This grid pattern is preserved in the interaction of reflected light from a substantially ideal mirror surface subject to the refraction effects which create the dark regions within the grid openings.

If the mirror 12 has spherical aberrations, for example a parabolic mirror, then a pattern such as that shown in FIG. 4 is generated and observed. The image of FIG. 4 provides curved fringe interference lines, though the same square grid of FIG. 2 is used. The mirror defects have caused the projected grid pattern to be displaced relative to the axial positions. This degree of displacement provides the information needed to reconstruct the mirror surface defects required to generate this pattern from the known grating grid.

It will be obvious to those skilled in the art that when the mirror 12 has additional or more varied surface defects the fringe pattern will exhibit additional curvature and warping of the observed fringe pattern. The enlarged symmetrically curved grid pattern of FIG. 4 is for purposes of illustration only and is achieved using simple, large, surface defects. For high accuracy mirror surface analysis of a plurality of smaller surface defects the number of fringe lines or data points analyzed would be much larger and several displacements or curves in different, non-symmetrical, directions may be observed across the grid for complex defect patterns.

The exemplary 76 fringe lines per inch grating previously discussed provides a large amount of observable detail. It is easily seen that both a high degree of accuracy and visibility of presentation is obtained for surface imperfections using the present inventive technique.

Where desired, one or more transfer or null lenses 28 can also be inserted along the observation axis 16 between the observation element 18 and the reflector 24 to enhance the image or lengthen the observation path.

Figure 6:
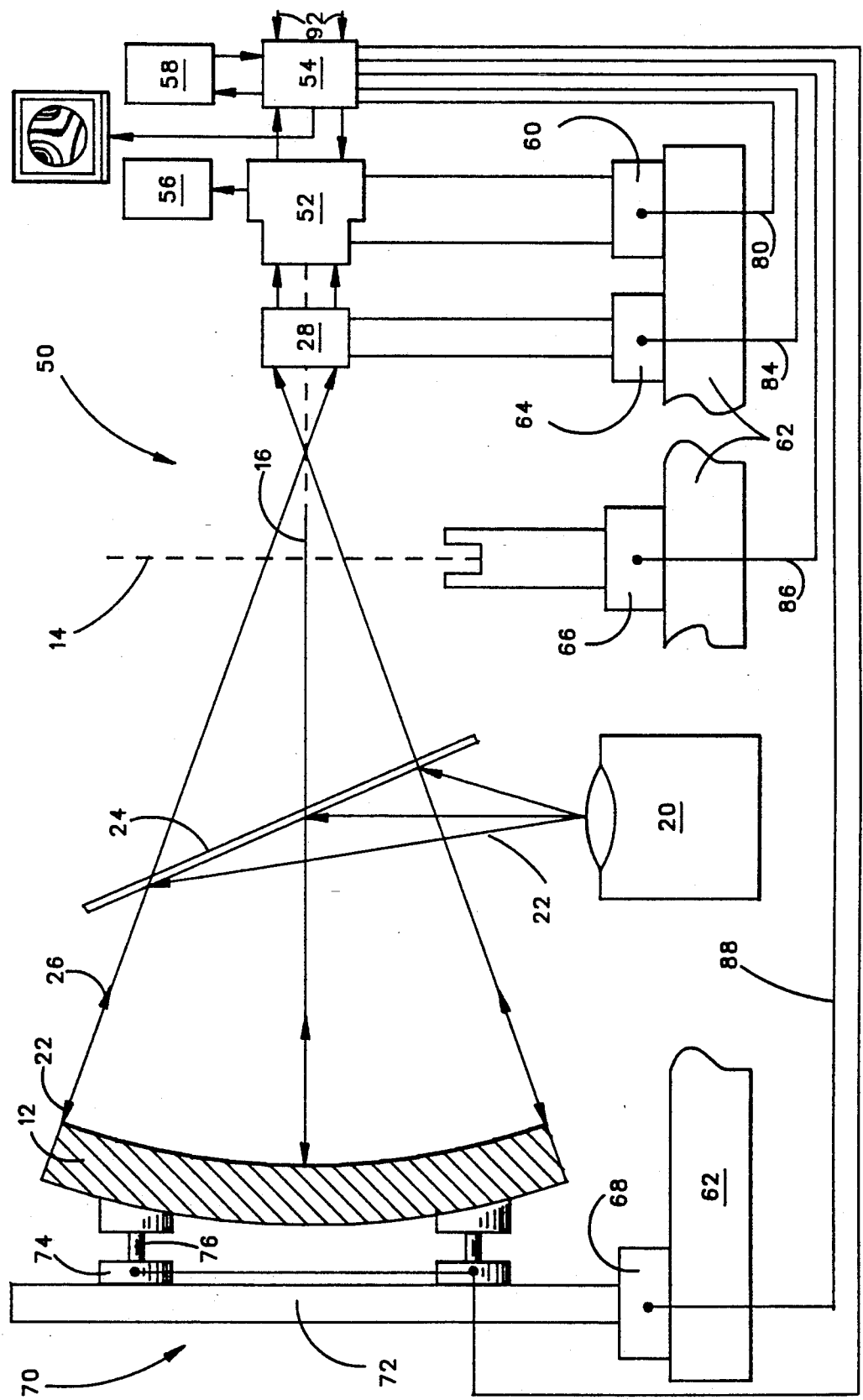
FIG. 6 illustrates an automation system for performing the method of the present invention.

While the above description discloses the advantages of the present invention, further improvement may be made by automating or electronically controlling part of the alignment process. FIG. 6 illustrates an application of computer or electronic control to the surface analysis process, and FIGS. 7a, 7b, 8a, 8b, 9a, 9b, and 9c illustrate digital surface maps resulting from such a process.

In FIG. 6, an electronically controlled or controllable surface mapping apparatus 50 is shown in which the mirror 12 is again tested and adjusted using a light source 20 to provide the input beam 22 off of the reflector 24 and the mirror 12. The light 26, is reflected by the mirror 12 through the grating 14, and observed by an imaging device 52. The device 52 is an electronic imaging device or system such as, but not limited to, a charge coupled device type camera. The imaging device 52 provides, as an electronic signal, a signal output which represents a digitized version of the observed fringe patterns. That is, the output signal maps the occurrence of light and dark areas in the fringe pattern into a digital representation of light and dark, or zeroes and ones. This information is, in turn, transferred through a data bus, cable, or connectors to a process controller or digital analyzer 54.

The camera 52 is typically mounted on a movable actuator or position translation element 60 which is in turn mounted on a support element 62. The translator 60 can be one of many known electro-mechanical devices such as a step motor or solenoid which can be operated using an input control signal. The translator 60 adjusts the position of the imaging device 60 relative to other parts of the apparatus 50 where appropriate, such as for accommodating both an alignment and surface testing process as discussed above.

The support 62 is a relatively fixed reference frame for the testing apparatus 50 components and can be a device such as an optical bench or a specially aligned support rail assembly. Those skilled in the art are familiar with these types of devices. The lens assembly 28 is also mounted on a position translator 64 for fine adjustments in relative position as necessary.

The cross grid grating 14 is secured to a position translator 66 and the mirror 12 is mounted on a horizontal position translator 68. The translator 68 generally acts as a movable support platform for a vertical position translator assembly 70 having a vertical support element 72 with one or more vertical translators 74 which move along the support element 72. The mirror 12 is secured to the translators 74 by elements such as mounting posts 76 which can further employ individually movable actuators or rotation elements to independently move different portions of the mirror 12 for alignment. Those skilled in the art will readily recognize that these translation components are illustrative of the devices found useful for achieving the operation of the invention and that there are other, often more complex, actuators and multiple-axis-of-freedom mounting systems which are useful in constructing the invention. It is only necessary that position translation devices be employed that are readily controllable though the application of control signals, including power or pulse width adjustable, or digital commands.

Each of the position translation drivers or actuators is typically connected to receive position correction signals or commands along a signal bus. This bus can also represent a bi-directional data channel which provides some positional information to the process controller 54 from the various components, such as through resistive or electro-mechanical sensors, etc. The position translators 60, 64, 66, 68, and 70 are shown being connected to the processor 54 through the command signal lines 80, 84, 86, 88, and 90, respectively.

The process controller represents one of many known devices for effecting control over motors and similar actuators by issuing command signals. The signals can be analog or digital control signals depending upon the type of translators or actuators employed. An exemplary process controller 54 comprises a digital computer having internal memory for storing predetermined control programs which respond to received image data and provide adjustments to the position of the mirror as required.

The computer also receives and analyzes the digitized fringe line data which has been framed grabbed by the CCD camera and then digitized. This is accomplished by electronically scanning the digitized data in preselected patterns, that is, left-to-right, bottom-to-top, et cetera, in order to determine the location of the fringe lines. The lines will be displaced by various defects but will each be used to generate the appropriate fringe index number through application of one or more analytical techniques to generate the monomial series coefficients discussed above. The computer also performs the adjacent fringe subtraction as part of this analysis of the fringe lines according to the process disclosed above.

The computer determines the monomial coefficients and then derives the corresponding Zernike coefficients. Using the Zernike coefficients, a wavefront, and thus surface, contour map is generated for the mirror. Exemplary surface contours developed using this technique are illustrated in the profiles of FIGS. 7, 8, and 9. Video display elements 56 can be used for performing two or three-dimensional displays of the wavefront contour where desired, or the contour printed or formed on a transportable media using a plotter.

The computer 54 can also employ memory or storage elements 58 for storing the image data or for compiling templates and known image selection criteria for determining the number of the fringe lines present in a received image. At the same time, human operator signals can be received through input lines 92 to help select or control operation of the process or to select or implement programs for operation.

Generally, a test mirror of known characteristics would be used to first verify and calibrate the system 50. Once the initial configuration of the apparatus is verified, a mirror of unknown surface quality or characteristics is mounted on the mounting posts 76 and aligned to the observation axis of the imaging device 52. During processing, an image can be presented to the video screen 56 as well as the controller 54. The digitized image data is used to determine the presence of the fringe lines and the controller 54 issues translation commands to the actuators 68 and 70 to realign the mirror where desired. The mirror can also be tilted relative to the observation axis 16 using appropriate translators or actuators mounted in series with the mounting posts 76. This type of system is highly efficient for large mirrors since it can compute the surface contours and intersection points for several measurements very quickly.

Using the square grid, as shown in FIG. 2, a good quality mirror was tested. The fringe pattern obtained was analyzed using "classical" techniques as in equations 4 and 5, and the new subtraction technique as in equations 7 and 8. The resulting Zernike coefficients are listed in Table II and provided the two-dimensional surface contour maps or representations shown in FIGS. 7a, and 7b, respectively.

Figure 7A:
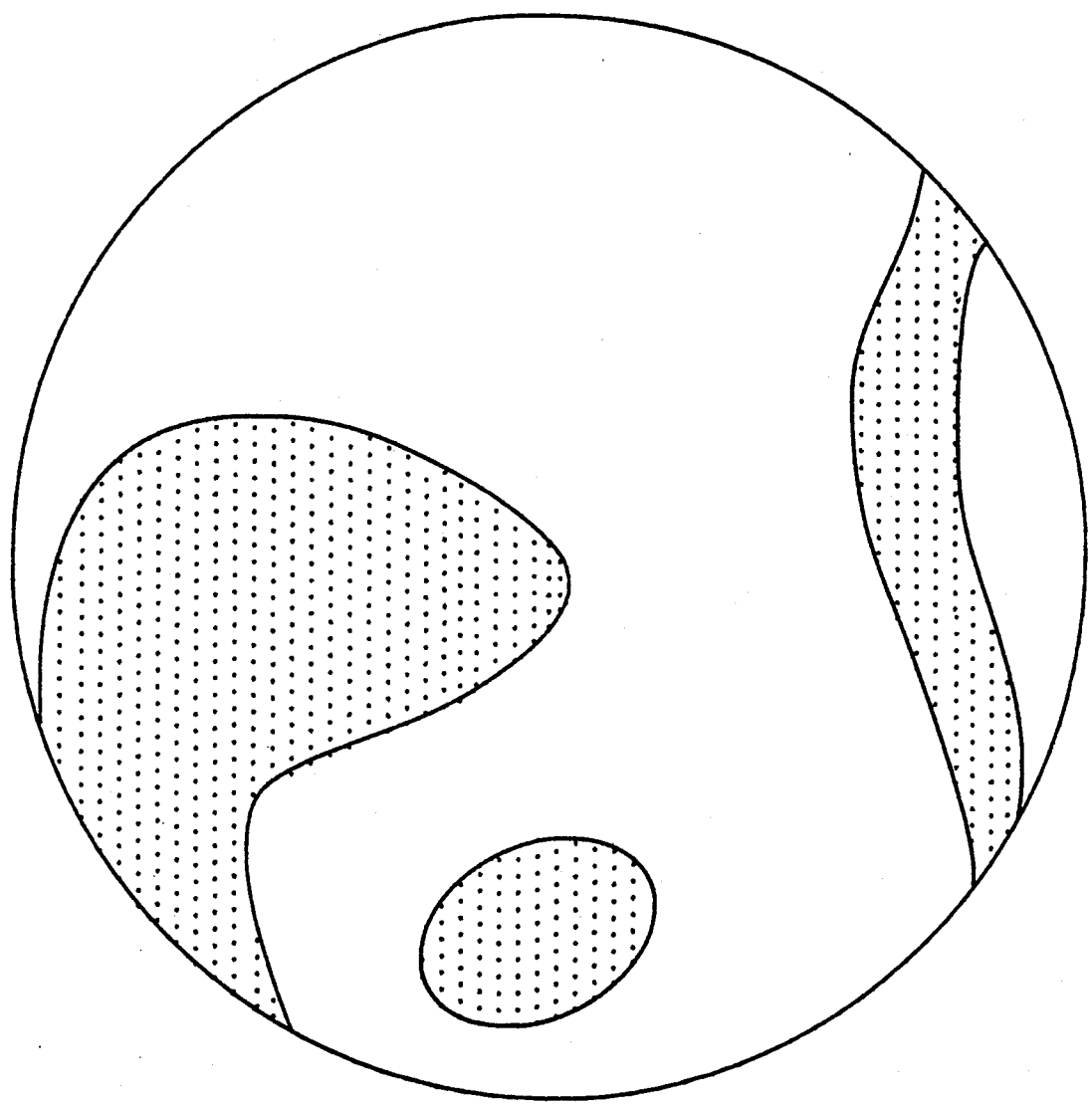
FIGS. 7a and 7b illustrate exemplary surface maps of a spherical mirror generated by the present invention without and with fringe subtraction.

The Zernike coefficients that were generated during this analysis were solved for an equivalent wavelength of 1.66 um. The effect of axis alignment error is shown in FIG. 7a where it influences asymmetrical aberrations such as the odd numbered coefficients representing coma and the even numbered coefficients representing astigmatism. When the subtraction method of the invention is employed, the resulting two-dimensional contour map is that of FIG. 7b where misalignment errors are removed and the asymmetric aberrations are reduced. The corrected analysis shows an almost perfect spherical mirror surface.

Figure 8A:
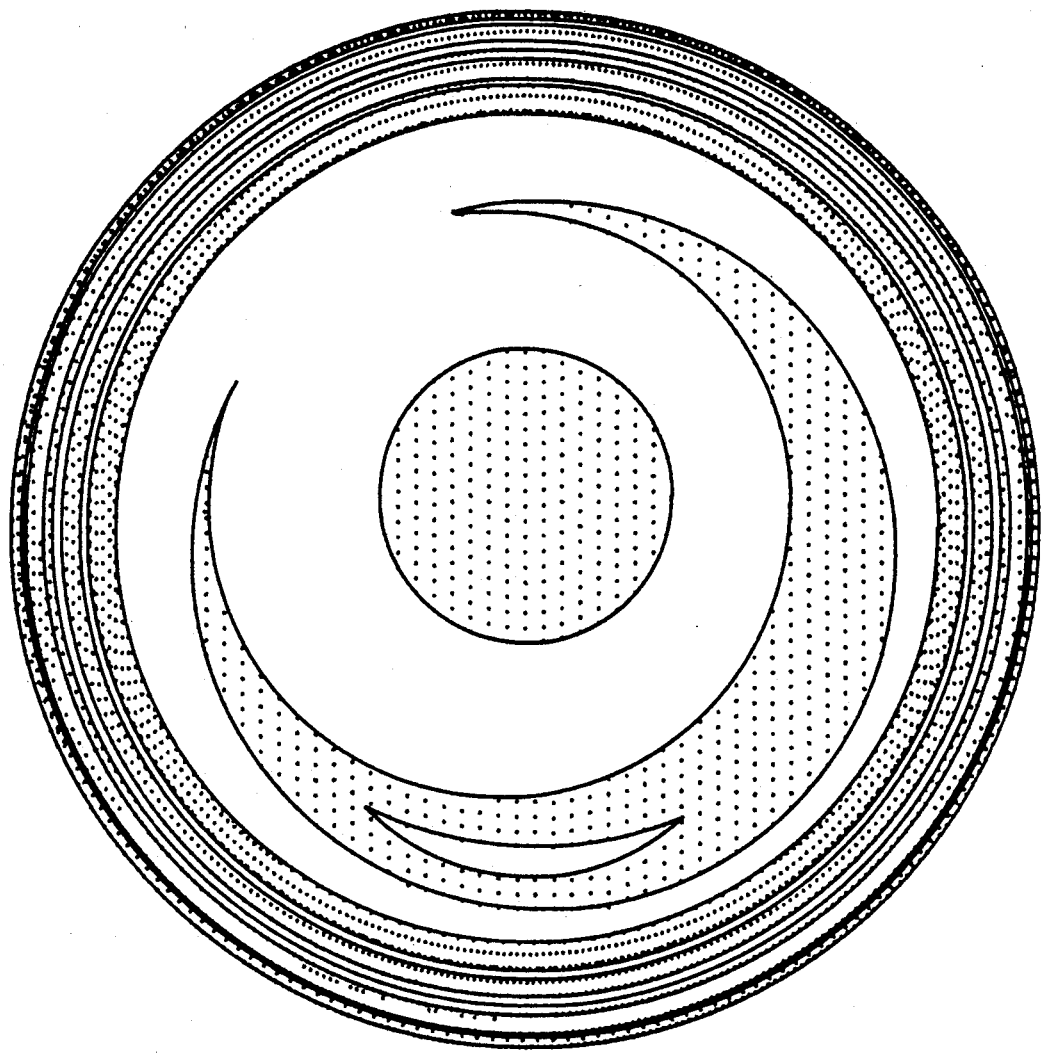
FIGS. 8a and 8b illustrate exemplary surface maps of a parabolic mirror generated by the present invention without and with fringe subtraction.
Figure 8B:
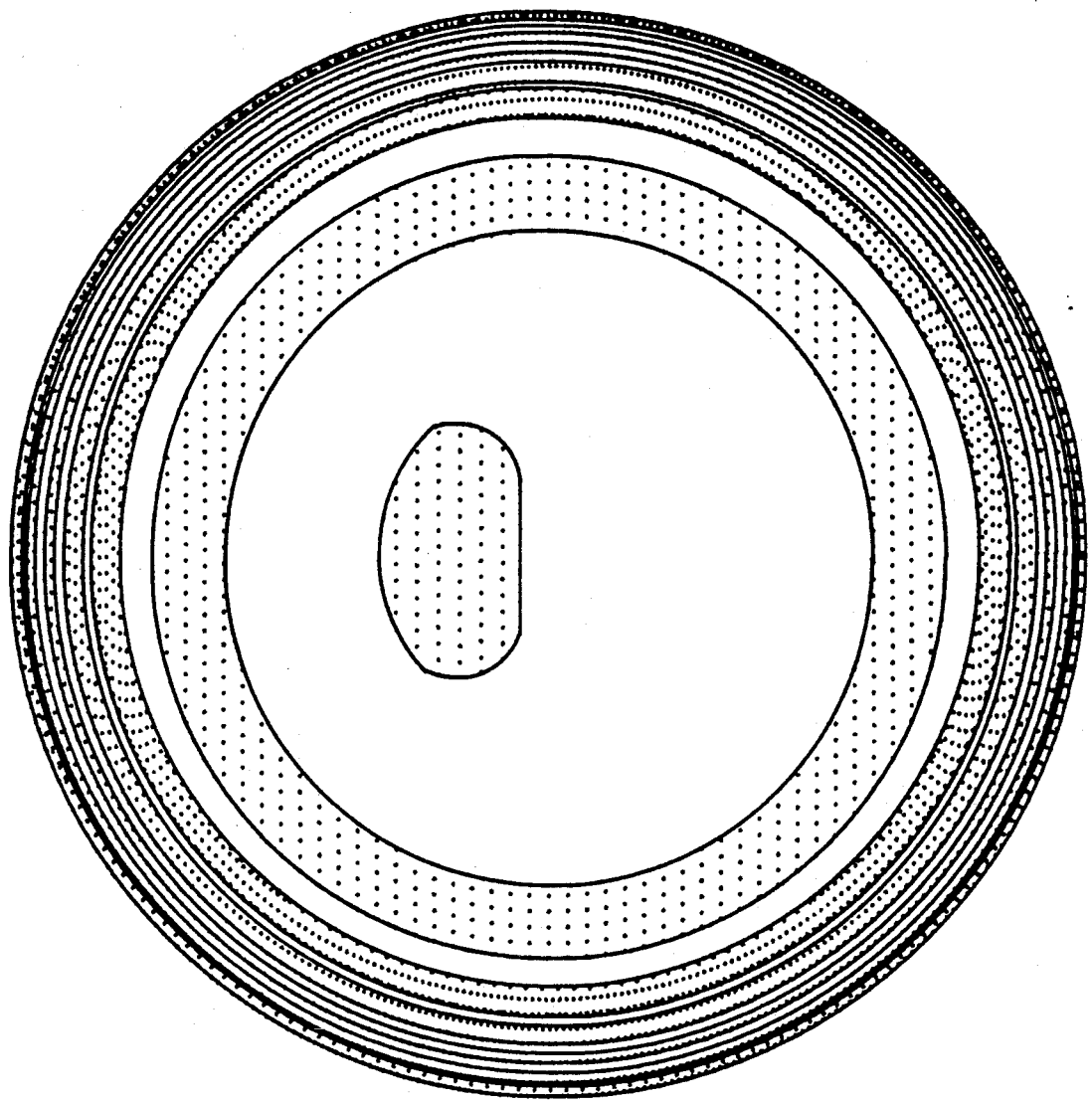

When the same technique, classical versus subtraction, was applied to a parabolic mirror the resulting surface reconstruction resulted in the two-dimensional maps shown in FIGS. 8a and 8b respectively. In this configuration the "transparent" or "clear" checkerboard pattern was aligned to the axis as opposed to aligning the dark grid lines. A similar erroneous analysis occurs for misalignment in FIG. 8a while this error disappears in FIG. 8b. Again, the Zernike coefficients are listed in Table II below, along with related RMS and Peak-to-valley values.

TABLE II

Figure 7B:
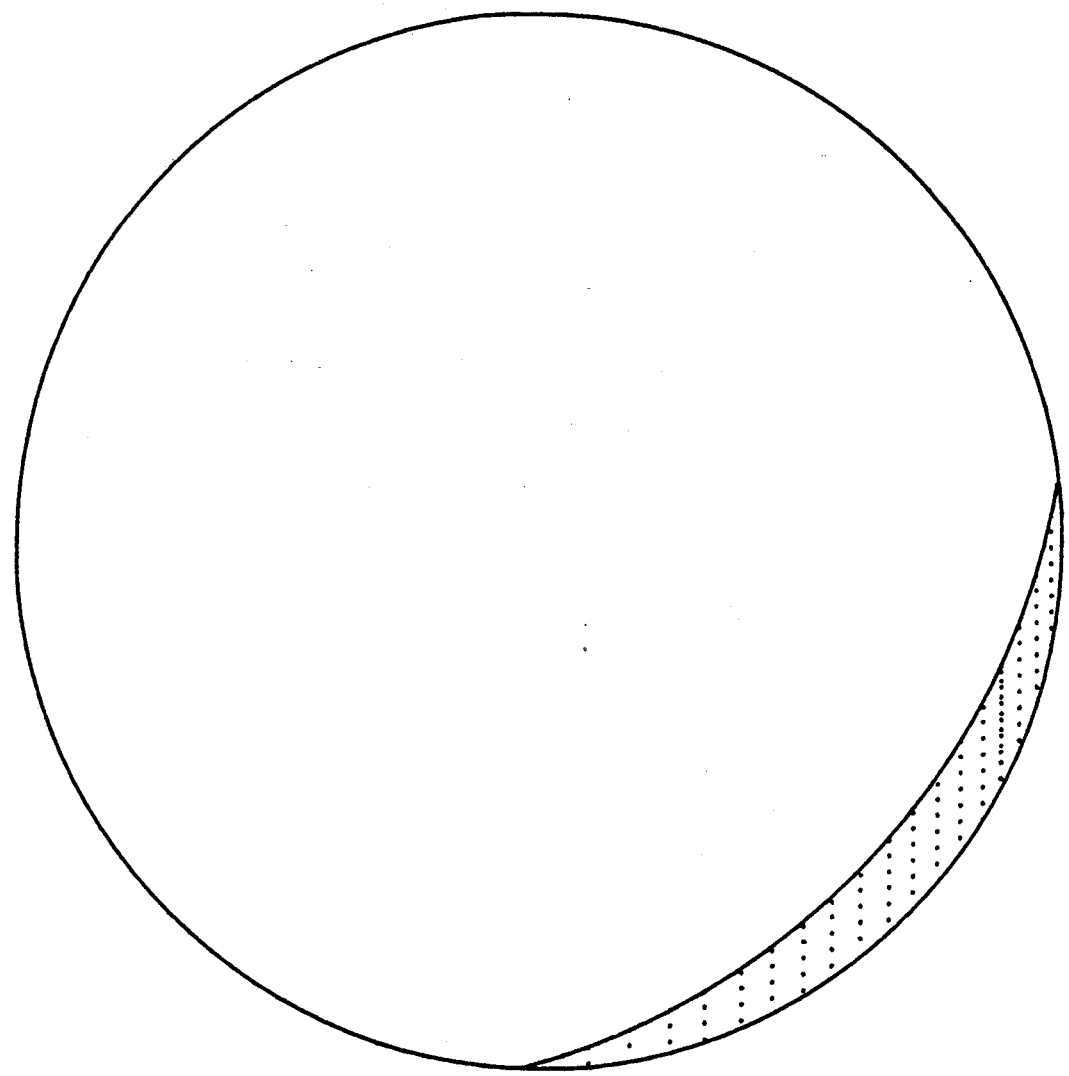

| COEFF. | FIG. 7a | FIG. 7b | FIG. 8a | FIG. 8b |
|---|---|---|---|---|
| R60 | −0.0100 | −0.0060 | 0.0830 | 0.0400 |
| C51 | 0.0000 | 0.0140 | −0.0600 | −0.0140 |
| S51 | 0.0170 | 0.0280 | −0.0610 | −0.0370 |
| C42 | −0.0810 | −0.0170 | 0.0960 | 0.0110 |
| S42 | 0.0280 | 0.0150 | −0.0020 | 0.0000 |
| R40 | 0.0410 | 0.0380 | 0.8730 | 0.5450 |
| C33 | 0.0550 | 0.0100 | 0.0210 | −0.0180 |
| S33 | −0.0150 | −0.0060 | −0.0350 | 0.0220 |
| C31 | 0.0970 | 0.0870 | −0.0120 | −0.1580 |
| S31 | 0.0630 | 0.0490 | 0.2820 | −0.0760 |
| C22 | 0.2280 | 0.0210 | 0.1800 | 0.1000 |
| S22 | −0.0970 | 0.0930 | 0.0720 | 0.0000 |
| C11 | 0.0000 | 0.0000 | 0.0000 | 0.0000 |
| S11 | 0.0000 | 0.0000 | 0.0000 | 0.0000 |
| R20 | 0.0000 | 0.0000 | 0.8000 | 1.4000 |
| RMS | 0.1158 | 0.0550 | 0.6202 | 0.8478 |

TABLE II-continued

| COEFF. | FIG. 7a | FIG. 7b | FIG. 8a | FIG. 8b |
|---|---|---|---|---|
| P-V | 1.2326 | 1.1097 | 2.7417 | 3.2092 |

To further illustrate the operation of the invention, the parabolic mirror used for the surface contour analysis of FIGS. 8a and 8b was also used to generate a series of three three-dimensional surface contour plots for an equivalent wavelength of 1.66 um. These three-dimensional plots were generated using different values for the reference radius of curvature value for the R20 Zernike coefficient and are presented in FIGS. 9a, 9b, and 9c. In these figures, the radius of curvature was varied by defocusing from 0 to 0.4 and 1.4. The result is a reference sphere that nearly matches the curvature of the parabola, one contacting the parabola along a midpoint of its height, and one contacting the parabola at its vertex, respectively. The values of R20 along with associated P-V and RMS values are presented in Table III. The plots show a larger perspective of the two-dimensional map illustrated in FIG. 7b.

TABLE III

Figure 9A:
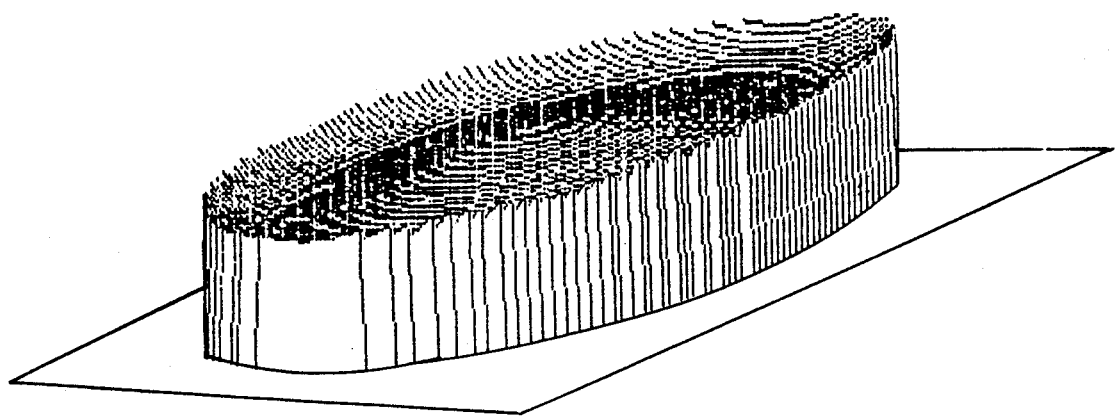
FIGS. 9a, 9b, and 9c illustrate exemplary surface contour profiles for a second parabolic mirror using three different reference radius values.
Figure 9B:
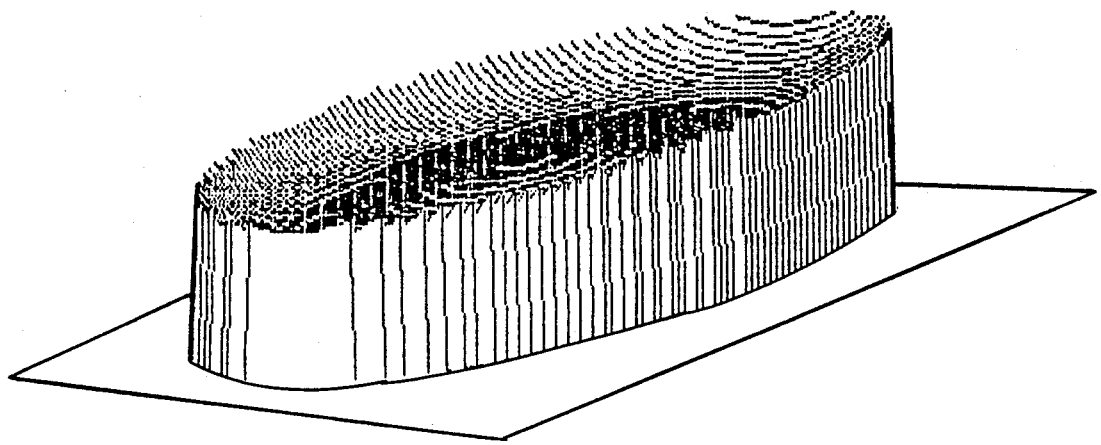
Figure 9C:
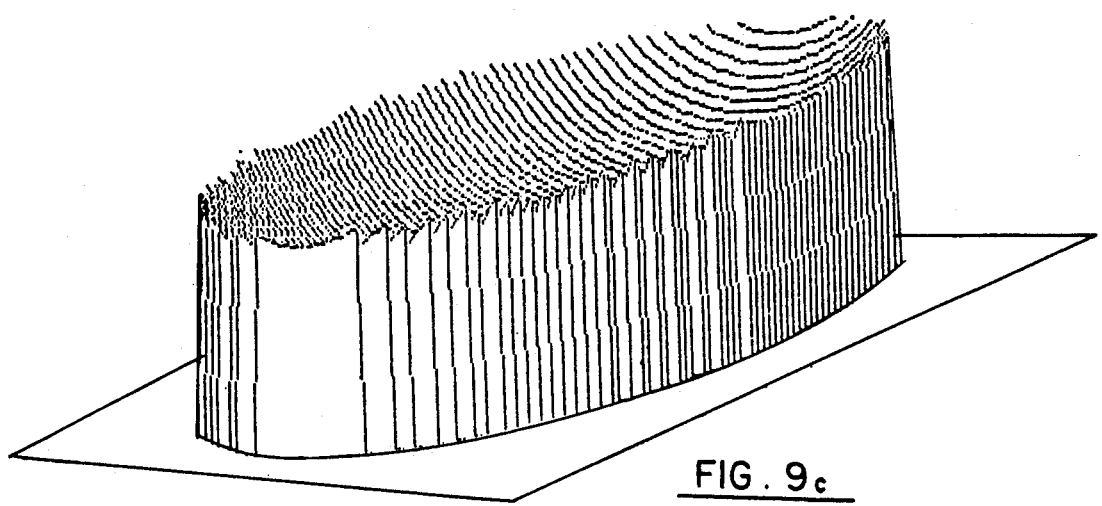

|  | FIG. 9a | FIG. 9b | FIG. 9c |
|---|---|---|---|
| R20 | 0.00 | 0.40 | 1.40 |
| RMS | 0.848 | 0.848 | 0.848 |
| P-V | 0.000 | 0.000 | 3.191 |

What has been described is a new technique for testing mirrors which provides for very accurate mapping of various surface defects and contours on a variety of mirror geometries, and is very efficient and economical to implement. This technique is also not sensitive to vibration (no damper needed) and can see larger surface deformations than observable with interferometry.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim as our invention is:

1. A method of measuring the optical surface characteristics of a mirror, comprising the steps of:
   reflecting light of preselected frequency from a surface of said mirror for which optical characteristics are to be determined along an observation axis;
   transferring said reflected light through a cross-grid type Ronchi grating of preselected and substantially uniform periodicity which is positioned along said observation axis so as to generate a grid type fringe pattern;
   sampling said fringe pattern at predetermined coordinate locations to determine a relative fringe number for each fringe number line in said pattern;
   forming a difference between adjacent fringe lines; and generating Zernicke coefficients for said fringe pattern.

2. The method of claim 1, wherein said steps of reflecting and transferring, comprise the steps of:
positioning a light reflection element transverse to said observation axis between said mirror and said grating, said reflection element having at least one optical surface reflective of said light positioned to reflect said light against said mirror surface, and substantially transmissive of light reflected from said mirror; and
illuminating said reflection element from a side facing said mirror with a beam of light.

3. The method of claim 1, wherein the step of sampling further comprises the step of transferring an image to a digitizing element and digitizing said fringe pattern.

4. The method of claim 3, further comprising the steps of:
estimating the fringe number at a plurality of coordinate locations along a series of common horizontal and then common vertical positions using a monomial series to represent the fringe number at each position;
solving for series coefficients using a generated plurality of said series; and
determining Zernike coefficients which correspond to said series coefficients.

5. The method of claim 4 further comprising the step of forming a difference between monomial series of adjacent fringe lines before solving for a relative fringe number.

6. The method of claim 5 further comprising the step of using said Zernike coefficients to reconstruct said mirror surface characteristics.

7. The method of claim 5 further comprising the step of using a digital computation means to estimate said fringe number and determine said Zernike coefficients.

8. The method of claim 7 further comprising the step of generating a digital representation of said mirror surface.

9. The method of claim 3 further comprising the steps of:
digitizing said observed fringes in a charge coupled device type of camera;
electronically scanning said digitized fringes; and
estimating the fringe number at a plurality of coordinate locations along a series of common horizontal and then common vertical positions using a monomial series to represent the fringe number at each position;
solving for series coefficients using a generated plurality of said series; and
determining Zernike coefficients which correspond to said series coefficients.

10. The method of claim 7 further comprising the step of computing all of said coefficients in a digital computation means.

11. Apparatus for determining the optical surface characteristics of mirror, comprising:
a cross grid-type Ronchi grating of preselected and substantially uniform periodicity positioned along a preselected observation axis for said mirror reflective surface;
projecting means for projecting a light beam onto said reflective surface of said mirror and through reflection onto said grating so as to generate an interference fringe pattern between said reflected light and said grating;
sampling means for sampling said fringe pattern at predetermined coordinate locations to determine a relative fringe number for each fringe line in said pattern;
subtraction means for forming a difference between adjacent fringe lines; and
translation means for computing Zernicke coefficients for said fringe pattern.

12. The apparatus of claim 11, wherein said projection means comprises:
a laser operating at a preselected frequency as an optical light source; and
a light reflection element positioned transverse to said observation axis which has at least one optical surface reflective of said laser light positioned to reflect said light against said mirror surface, and is substantially transmissive of reflected light from said mirror.

13. The apparatus of claim 11, wherein said sampling means further comprises an image digitizing element.

14. The apparatus of claim 11, wherein said sampling means further comprises:
estimation means for estimating the fringe number for each fringe line at a plurality of coordinate locations along a series of common horizontal and then common vertical positions using a monomial series to represent the fringe number at each position;
coefficient generation means for determining series coefficients using a generated plurality of said series.

15. The apparatus of claim 14 further comprising a subtraction means for forming a difference between monomial series of adjacent fringe lines before said relative fringe number is estimated.

16. The apparatus of claim 15 further comprising a digital computation means for generating said fringe number and Zernike coefficients.

17. The apparatus of claim 16 further comprising:
scanning means for digitizing said observed fringes; and said computation means comprises:
index means for computing the fringe number at a plurality of coordinate locations along a series of common horizontal and then common vertical positions using a monomial series to represent the fringe number at each position, and
coefficient means for solving for series coefficients using a generated plurality of said series.

18. The apparatus of claim 17 further comprising presentation means for forming a visual representation of said mirror surface from Zernike coefficient information.

* * * * *